(12) United States Patent
Brooking et al.

(10) Patent No.: US 8,165,711 B2
(45) Date of Patent: Apr. 24, 2012

(54) AUTOMATED GENERATION OF GARMENT CONSTRUCTION SPECIFICATION

(75) Inventors: Cole Brooking, Kirkland, WA (US); Nishant Dani, Redmond, WA (US); Pragyana K. Mishra, Kirkland, WA (US); Pengpeng Wang, Redmond, WA (US); Manjula Ananthnarayanan Iyer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 12/652,351

(22) Filed: Jan. 5, 2010

(65) Prior Publication Data

US 2011/0166682 A1    Jul. 7, 2011

(51) Int. Cl.
*G06F 19/00* (2011.01)

(52) U.S. Cl. ............................................. 700/132

(58) Field of Classification Search ........... 700/130–133
See application file for complete search history.

(56) References Cited

U.S. PATENT DOCUMENTS

| | | | |
|---|---|---|---|
| 4,916,634 A * | 4/1990 | Collins et al. | 700/132 |
| 6,310,627 B1 * | 10/2001 | Sakaguchi | 345/630 |
| 6,473,671 B1 | 10/2002 | Yan | |
| 6,907,310 B2 | 6/2005 | Gardner et al. | |
| 7,039,486 B2 | 5/2006 | Wang | |
| 7,079,134 B2 | 7/2006 | Kung et al. | |
| 7,149,665 B2 * | 12/2006 | Feld et al. | 700/131 |
| 7,479,956 B2 | 1/2009 | Shaw-Weeks | |
| 7,548,794 B2 | 6/2009 | Vandergriff et al. | |
| 2001/0026272 A1 * | 10/2001 | Feld et al. | 345/419 |
| 2004/0049309 A1 * | 3/2004 | Gardner et al. | 700/132 |
| 2004/0078285 A1 * | 4/2004 | Bijvoet | 705/26 |
| 2004/0158345 A1 * | 8/2004 | Watanabe | 700/132 |
| 2005/0240416 A1 | 10/2005 | Schindler et al. | |
| 2007/0198118 A1 * | 8/2007 | Lind | 700/138 |
| 2009/0193675 A1 | 8/2009 | Sieber | |
| 2009/0222127 A1 | 9/2009 | Lind | |

OTHER PUBLICATIONS

"V-Stitcher", Retrieved at <<http://softwaresolutions.fibre2fashion.com/featured-solution/v-stitcher-3d-technology/index.asp>>, 2009, pp. 2.
Volino, et al., "From early virtual garment simulation to interactive fashion design", Retrieved at <<http://citeseerx.ist.psu.edu/viewdoc/download?doi=10.1.1.60.1507&rep=rep1&type=pdf>>, Computer-Aided Design, vol. 37, Issue 6, May 2005, pp. 593-608.
Volino, et al., "Accurate Garment Prototyping and Simulation", Retrieved at <<http://citeseerx.ist.psu.edu/viewdoc/download?doi=10.1.1.94.1310&rep=rep1&type=pdf>>, Computer-Aided Design & Applications, vol. 2, No. 5, 2005, pp. 645-654.
Decaudin, et al., "Virtual Garments: A Fully Geometric Approach for Clothing Design", Retrieved at <<http://citeseerx.ist.psu.edu/viewdoc/download?doi=10.1.1.111.4458&rep=rep1&type=pdf>>, Computer Graphics Forum (Eurographics'06 proc.), vol. 25, No. 3—Sep. 2006, pp. 10.
Protopsaltou, et al., "A Body and Garment Creation Method for an Internet Based Virtual Fitting Room", Retrieved at <<http://www.miralab.unige.ch/repository/papers/51.pdf>>, Oct. 27, 2009, pp. 18.

* cited by examiner

*Primary Examiner* — Nathan Durham

(57) ABSTRACT

Sketches, notes and 2D computer drawings of a designed garment can be input into a computing device. The computing device can apply optical character recognition, shape inference, figure recognition, domain intelligence and inferred knowledge to automatically generate a garment construction specification from the input information. The garment construction specification can include a detailed description of each component of the garment, followed by step-by-step instructions, such as could be consumed by a computer-controlled device, regarding the joining of the components to create the garment. A virtual garment generation mechanism can create a 3D rendering of the garment by constructing each component and then joining them together to act as a single 3D piece. Material behavioral properties can also be applied to the 3D rendering. User feedback regarding the 3D rendering can be utilized to create a modified garment construction specification which can ultimately, when approved, be provided to a garment manufacturer.

15 Claims, 5 Drawing Sheets

AUTOMATED GENERATION OF GARMENT CONSTRUCTION SPECIFICATION

BACKGROUND

The garment manufacturing industry, like many industries, relies on a specialized set of knowledge that is acquired by workers in that industry. For example, when a garment designer initially sketches an idea for a new garment, many of the details of manufacturing such a garment, such as, for example, where stitches are to be placed, how seams are to be aligned, and other like manufacturing details are left unstated. The garment sketch can then be provided to a garment manufacturer to create one or more initial garment prototypes. Employees at the garment manufacturer apply specialized knowledge unique to the garment industry to derive, from the garment sketch, the manufacturing details needed to actually manufacture such a garment. In some cases, a garment designer can specify certain aspects or attributes of their envisioned garment to guide the garment manufacturer in generating the garment prototype.

Once a garment prototype is made, it can be returned to the garment designer for approval and subsequent editing. Traditionally, a single garment can entail multiple iterations and exchanges between the garment designer and the garment manufacturer before a final prototype is created that will serve as the basis for the manufacture of such a garment in large quantities for distribution to sales outlets throughout the world.

Efforts to take advantage of the abilities of computing devices within the context of the garment manufacturing industry have traditionally focused upon the generation of accurate three-dimensional models of garments to enable the garment designer to better, and more quickly, visualize their design. Such more accurate three-dimensional models have likewise been implemented within the context of garment purchasing, seeking to enable users to more accurately understand how a particular garment will fit and will look on their particular body type without actually having to physically locate the garment and try it on.

SUMMARY

In one embodiment, a garment construction specification can be automatically generated from traditionally generated garment design information, such as sketches, two-dimensional Computer Aided Design (CAD) files, designer notes and other like information. The garment construction specification can be generated with reference to modules that codify the industry-specific knowledge of those in the garment manufacturing industry. In its final form, the garment construction specification can include details regarding the individual components of a garment and details regarding the mechanisms and mechanics by which such components can be joined to form the final garment. The garment construction specification can be a standardized, detailed specification that can be provided to garment manufacturers to enable the manufacturing of garments with a minimum of variance between the envisioned design and the final manufactured product.

In another embodiment, one or more user interfaces can be provided to enable a user, such as a garment designer, to provide feedback on the garment construction specification that was automatically generated. The user interface can enable the user both to directly modify the garment construction specification and to indirectly modify it, such as by modifying a visualization of the garment in accordance with the garment construction specification, or by adjusting the results of various filters and analytics applied in automatically generating the garment construction specification.

In a further embodiment, a garment construction specification can be provided to a virtual garment generation mechanism to generate a realistic, three-dimensional rendering of the garment. The virtual garment generation mechanism can comprise information regarding the behavioral properties of materials commonly used in the garment industry, and can also comprise one or more three-dimensional models of humans, traditionally referred to as human "avatars", upon which to layer the garment.

In a still further embodiment, the realistic, three-dimensional rendering of the garment can be modified in accordance with user input, such as through an appropriate user interface, to further adjust, or modify the garment construction specification. A three-dimensional rendering based on the new garment construction specification can then be performed, and such an iterative process can continue until the designer of the garment is satisfied, at which point the garment construction specification can be finalized and utilized to aid in the manufacture of such a garment.

In a still further embodiment, multiple garment construction specifications can be generated in tandem such that information from one of the garment construction specifications can inform aspects of another of the garment construction specifications. The multiple garment construction specifications can be jointly provided to the virtual garment generation mechanism to enable the realistic, three-dimensional rendering of multiple garments, such as multiple garments that can be simultaneously worn on different parts of the body and such as multiple garments that can be layered one on top of another.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
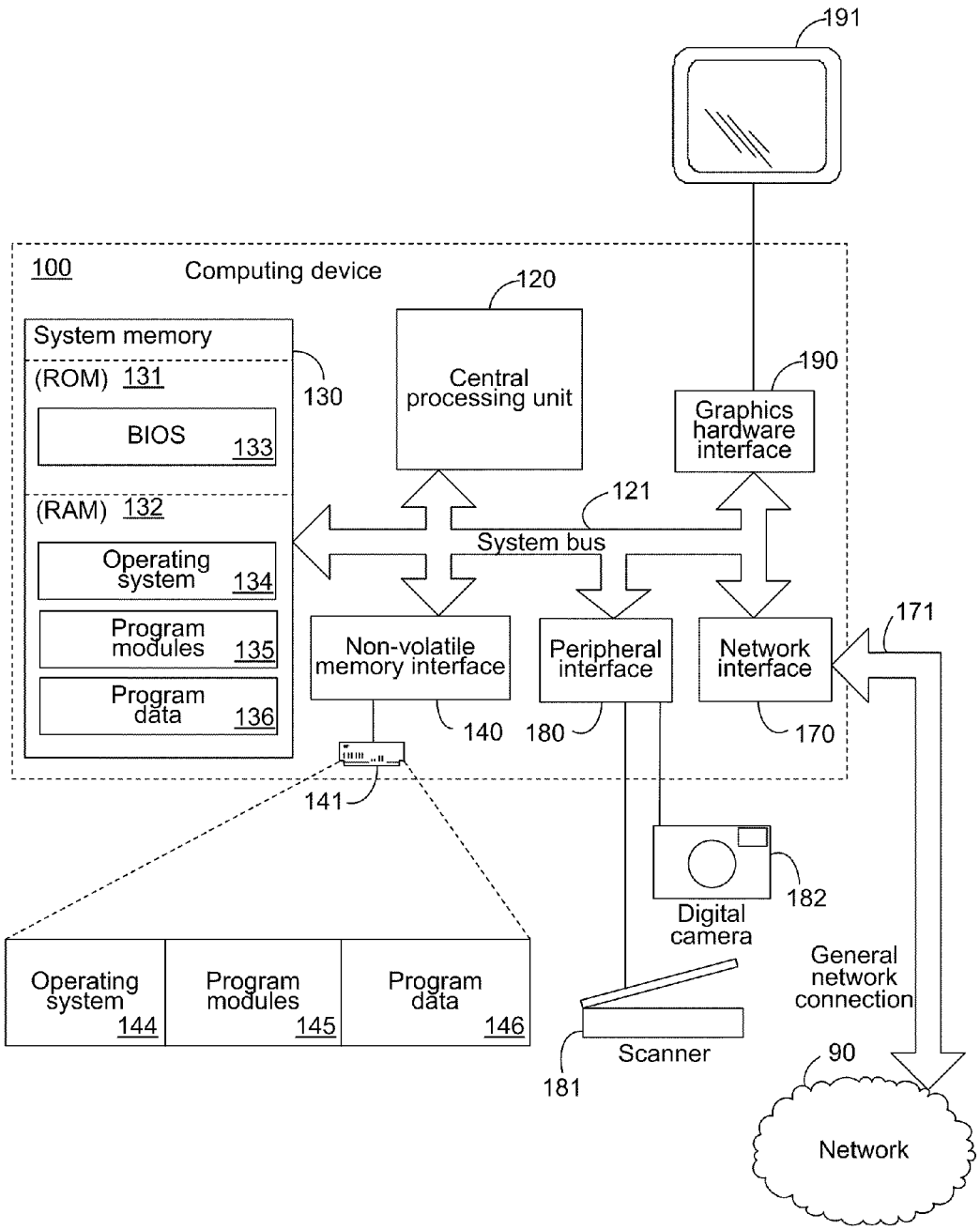
FIG. 1 is a block diagram of an exemplary computing device.

The following description relates to the generation, in a substantially automated manner, of a garment construction specification. Materials that would be traditionally generated in the design of a document, such as sketches, two dimensional Computer-Aided Design (CAD) drawings, designer notes, and other like information can be input into a garment construction specification mechanism. The garment construction specification can be generated by analyzing and parsing the input information, especially in light of industry-specific knowledge that can be codified into a computer-consumable format. The resulting garment construction specification can be further edited by a user, either directly or indirectly, such as by editing aspects of the garment described by the garment construction specification. A three-dimensional representation of the garment can then be generated in light of the garment construction specification, behavioral properties of materials found in the garment, three-dimensional human models, and other like information. The three-dimensional representation of the garment can further be utilized by the user to change the garment construction specification. Upon finalization of a garment construction specification, the garment construction specification can be provided to one or more garment manufacturers and can be utilized by such manufacturers to manufacture the garment in a more controlled, and more specified manner.

For purposes of illustration, the techniques described herein make reference to specific examples of the various garment-centric design elements. The mechanisms described, however, are in no way limited to only those specific design elements. Indeed, the techniques described are applicable to any aspect of the design and manufacture of a garment.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation, by a processing unit, of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated upon which, and in conjunction with which, the below-described mechanisms can be implemented. The exemplary computing device 100 of FIG. 1 can include, but is not limited to, one or more central processing units (CPUs) 120, a system memory 130, that can include RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, such as for the display of visual user interfaces, including, but not limited to, a graphics hardware interface 190 and a display device 191. Additionally, the computing device 100 can also include peripheral input elements, including, but not limited to a scanner 181 and a digital camera 182 that can be utilized by a user to input paper-based information, such as sketches, notes and other like information. The peripheral input elements can be communicationally coupled to the system bus 121 via a peripheral interface 180.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates the operating system 134 along with other program modules 135, and program data 136.

The computing device 100 may also include other removable/non-removable, volatile/nonvolatile computer storage media. By way of example only, FIG. 1 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG.

1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment using logical connections to one or more remote computers. The computing device 100 is illustrated as being connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

In one embodiment, one or more computing devices, such as the computing device 100, can be utilized to generate a garment construction specification from information such as would have traditionally been generated by a garment designer. For example, the scanner 181 or digital camera 182 can be utilized to convert into a digital form, such as can be processed and understood by the computing device 100, garment sketches, notes, design ideas, or other like paper-based information that may have been generated as part of the conceptualization of a new garment. In addition, the general network connection 171, or other communicational interface of the computing device 100, can be utilized to provide to, and store on, a computer-readable storage medium computer-readable data that is, likewise, a part of the conceptualization of a new garment, such as, for example, two-dimensional Computer Aided Design (CAD) drawings of the new garment, or one or more components thereof.

Figure 2:
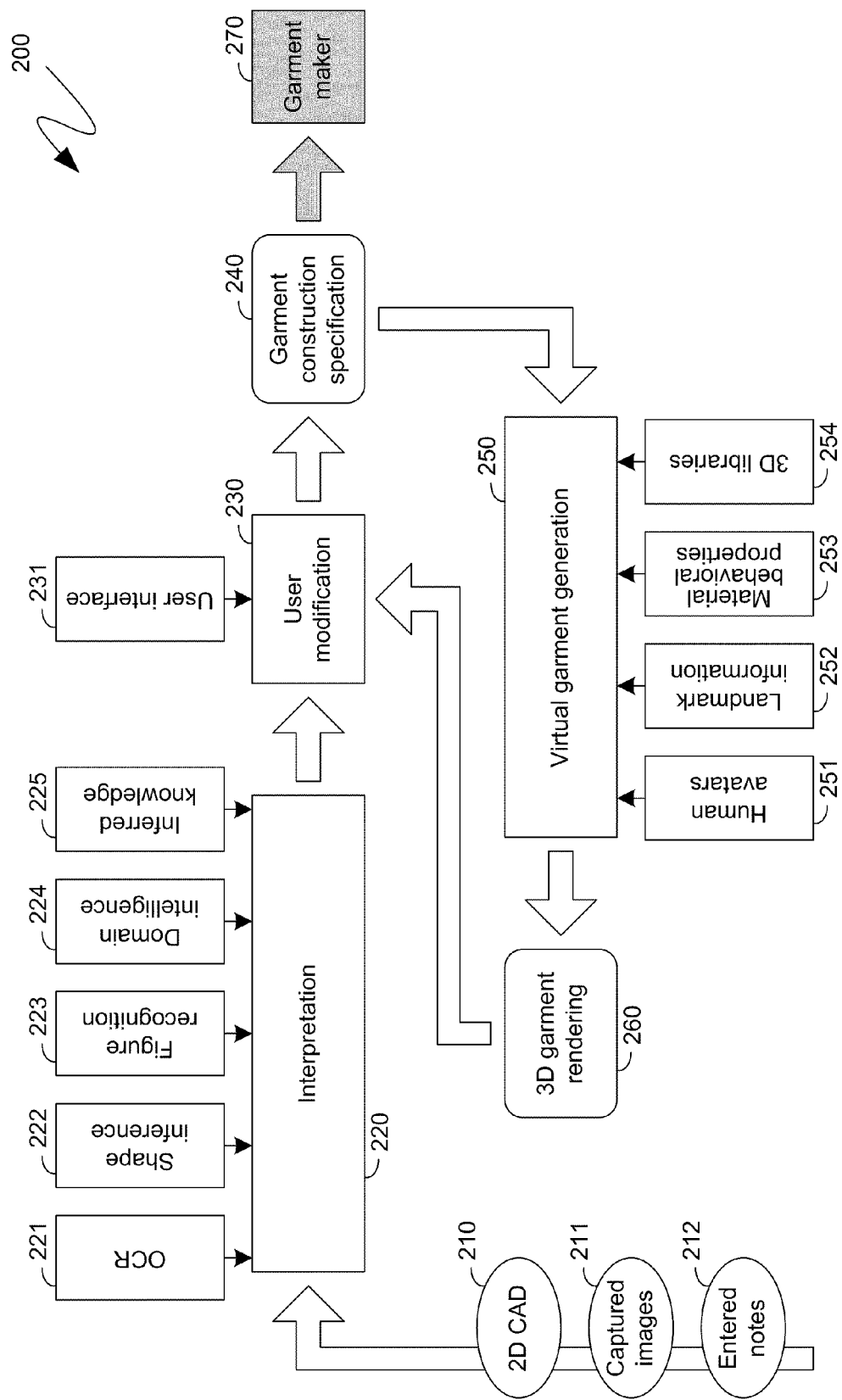
FIG. 2 is a block diagram of an exemplary garment construction specification generation mechanism.

Turning to FIG. 2, the system 200 shown therein illustrates an exemplary system for generating a garment construction specification, such as the garment construction specification 240. Initially, as shown in the system 200, and as indicated above, traditionally generated garment data can be provided to the interpretation mechanism 220. Such data can include two dimensional CAD data 210, images or sketches 211, and notes 212, such as can be input by the scanner 181, or the digital camera 182 (shown in FIG. 1), or can be entered directly into the computing device 100 (also shown in FIG. 1) such as via a keyboard, mouse, or other traditional user input elements. Upon receipt of the data 210, 211 and 212, the interpretation mechanism 220 can utilize some or all of the Optical Character Recognition (OCR) mechanism 221, the shape inference mechanism 222, figure recognition mechanism 223, the domain intelligence 224, and the inferred knowledge 225 to generate the garment construction specification 240.

In one embodiment, if the data received by the interpretation mechanism 220 comprises written words that were captured in a digital format, such as by the scanner 181, or the digital camera 182 (shown in FIG. 1), the interpretation mechanism can utilize the OCR mechanism 221 to translate such data into computer-parseable words or instructions. Subsequently, the interpretation mechanism 220 can utilize the shape inference mechanism 222 to identify, from the data provided, the type of garment that will be described by the garment construction specification. For example, in one embodiment, the shape inference mechanism 222 can recognize shapes relevant to the garment industry, such as distinguishing between long and short sleeve shirts, miniskirts and ankle-length skirts, shorts and pants, and other like garment shapes. The shape inference mechanism 222 can, therefore, be applied to two dimensional CAD data 210, or even to captured images 211, such as digitized sketches and other like paper-based drawings.

Once the interpretation mechanism 220 has narrowed down the type of garment that will be described by the garment construction specification 240, it can utilize an appropriate aspect of the domain intelligence 224 and the inferred knowledge 225 to obtain detailed information from the data that was provided. In addition, the interpretation mechanism 220 can utilize the figure recognition mechanism 223 to be able to gather information about the designed garment as it relates to a human that would be wearing such a garment. In one embodiment, the figure recognition mechanism 223 can comprise basic human body shapes, and relevant landmarks thereon, to provide the interpretation mechanism 220 with information regarding the intended fit, or wearing, of the designed garment by a human. For example, the figure recognition mechanism 223, can recognize that a particular hole in a garment can be intended as the opening through which a head would be inserted, while other holes in the garment can be intended as the openings through which arms would be inserted. In such a manner, the figure recognition mechanism 223 can provide the interpretation mechanism 220 with a basic orientation of the design garment on an intended wearer. As another example, the figure recognition mechanism 223, can further recognize which portions of the garment described by the input data 210, 211 and 212 are intended to sit upon, align with, or otherwise accommodate various landmarks on the human body, such as elbows, shoulders, knees, waists, and other like landmarks. The figure recognition mechanism 223 can, therefore, provide the interpretation mechanism 220 with an association between specific aspects of the designed garment and specific landmarks on the human body.

In one embodiment, the domain intelligence 224 and the inferred knowledge 225 can be segmented, at least in part, in accordance with garment types. Thus, an aspect of the domain intelligence 224 and the inferred knowledge 225 that may be applicable to, for example, a T-shirt, can differ from an aspect of the domain intelligence and inferred knowledge that may be applicable to, for example, a skirt. Thus, the domain intelligence 224 and the inferred knowledge 225 that can be utilized by the interpretation mechanism 220 can be dependent on the type of garment for which the garment construction specification 240 is being generated, such as can be determined with reference to the shape inference mechanisms 222.

The domain intelligence 224 can provide information to the interpretation mechanisms 220 that can be relevant to the construction of the garment described by the data 210, 211 and 212, such templates of construction mechanisms typically utilized in the construction of the particular garment. For example, if the garment for which the garment construction specification 240 is being generated is a T-shirt, the domain intelligence 224 can indicate, to the interpretation mechanisms 220, that a T-shirt is traditionally generated by sewing together a front and back component and then sewing on a collar. The interpretation mechanisms 220 can then utilize such information when evaluating the garment data 210, 211 and 212.

In a similar manner, the inferred knowledge 225 can provide, to the interpretation mechanisms 220, information relevant to annotations or other like aspects of the garment's design as would have been contained in the garment data 210, 211 and 212. For example, the inferred knowledge 225 can interpret commonly used symbols or methodology that may be contained in the garment data 210, 211 and 212 for interpretation mechanisms 220. The inferred knowledge 225 can also provide information that may be specific to the type of garment for which the garment construction specification 240 is being generated, including the type of knowledge that would traditionally be known by those working in the garment manufacturing industry. Thus, for example, the inferred knowledge 225 can contain information regarding different manufacturing options relevant to the type of garment for which the garment construction specification 240 is being generated including, for example, options such as the type of stitching, the manner in which discrete segments of the garments are joined, and other like information to enable the garment construction specification 240 to appropriately interpret the garment data 210, 211 and 212.

While the above descriptions have been directed to the generation of a single garment construction specification 240 for a single garment, multiple garment construction specifications for multiple garments can be similarly constructed by applying the above-described mechanisms to multiple garments. Should the multiple garments be related, such as garments that can be simultaneously worn, each on different body parts, or as garments that can be simultaneously worn on the same body part in layers, information from one garment construction specification can be used to inform aspects of another, related garment construction specification. For example, the shape inference mechanism 222 can look for common shapes to detect whether the multiple garments for which the multiple garment construction specifications are being generated are garments that are intended to be worn as layers. Similarly, the inferred knowledge mechanism 225 can apply a particular set of inferred knowledge when the multiple garments are designed to be worn simultaneously on different parts of the body, such as a shirt and pants, or a blouse and skirt.

The interpretation mechanisms 220 can, with the aid of the above described components, generate a preliminary garment construction specification that can, should the user so desire, be presented to the user for user modification, such as can be implemented by the user modification component 230. In one embodiment, the user modification component 230 can comprise information relevant to the presentation of the garment construction specification 240 in a manner understandable by the user, and can further comprise mechanisms by which user input can be translated into discrete and specific changes to the garment construction specification. And, thus, the user modification component 230 can utilize the user interface element 231 to generate and present the user interface, such as the exemplary user interface 300 illustrated in FIG. 3.

The user modification component 230 can present, to the user, the garment construction specification 240 in a more user-friendly manner, including, for example, by generating a preliminary two-dimensional and three-dimensional representation of the garment as codified by the garment construction specification. Additionally, user modification component 230 can, with the aid of the user interface 231, receive input from the user that can modify the garment construction specification 240. For example, the user modification component 230 can receive user input directed to specific elements of the garment construction specification 240, including, for example, changes to the coordinates, sizing, materials, stitching instructions, or other like information that can be contained in the garment construction specification. The user modification component 230 can also receive user input of a more general nature, such as, for example, user input that indicates that a particular interpretation of the interpretation mechanisms 220 was in error. In such a case, user modification component 230 can determine the appropriate specific changes to the garment construction specification 240 to account for and implement the user's request to change.

In one embodiment, garment construction specification 240, such as can have been generated by the interpretation mechanisms 220, and modified with user modification component 230, can be comprised of an initial portion describing, in detail, manufactured components of the garment, followed by a subsequent portion describing, in detail, manufacturing processes applied to such components to generate the garment. The initial portion of the garment construction specification 240 can provide coordinates defining the boundaries, such as the corners and edges, of each component of the garment, as well as information regarding the material, color, and other like properties of each component of the garment. The subsequent portion of the garment construction specification 240 can provide step-by-step instructions, such as can be consumed by a computerized process, for the construction of the garment from the components defined in the initial portion. Thus, for example, the subsequent portion of the garment construction specification 240 can provide information regarding the manner in which two or more garment components are joined, the coordinate locations at which they are joined, human landmarks relevant to the garment components, and other like information.

The garment construction specification 240 can be stored in any form that is sufficiently universal to enable its adoption by garment manufacturers having differing types of computing devices at their disposal. In one embodiment, the garment construction specification 240 can utilize the eXtended Markup Language (XML) to retain the information described above in a hierarchical manner. However, as will be obvious to those skilled in the art, other data storage formats are equally applicable to the garment construction specification 240.

Once generated, the garment construction specification 240 can be provided to a virtual garment generation mechanism 250 to generate a three-dimensional garment rendering 260 that can represent a detailed three-dimensional view of a virtual garment constructed in accordance with the information contained in the garment construction specification 240. In generating the three-dimensional garment rendering 260, the virtual garment generation mechanisms 250 can utilize existing three-dimensional rendering technologies and libraries 254, material behavioral properties 253, landmark information 252 and human avatars 251. As will be known by those skilled in the art, the human avatars 251 can comprise information necessary to generate a three-dimensional representation of the human of a particular type. For example, one collection of information can define a three-dimensional representation of a short human male, while another collection of information can define a three-dimensional representation of a tall human female. Other avatars can be generated to accommodate different body styles, weight distribution and overall weight, and even aesthetic factors such is hair, eye, and skin color. For each of the avatars 251, the landmark information 252 can define the coordinates, or coordinate ranges, of various landmarks on the human body relevant to the garment industry. In one embodiment, landmarks identified by the landmark information 252 can comprise elbows, wrists, shoulders, base and top of a neck, waists, knees, ankles, and other like human body landmarks. The landmark information 252 can be coordinated with the interpretation mechanisms 220, and relevant components thereof, to provide a common landmark identification convention such that the landmarks identified in the garment construction specification 240 are landmarks that are defined within the landmark information 252 utilized by the virtual garment generation 250.

In addition to information regarding three-dimensional renderings of the human body, the virtual garment generation 250 can also utilize existing three-dimensional mechanisms and libraries 254, such as can have been developed in the three-dimensional rendering arts. For example, the libraries 254 can comprise information and instructions relevant to the generation of realistic lighting, surfaces, behavioral patterns, and other like information. In some cases, however, already existing three-dimensional mechanisms and libraries may not be sufficient for purposes of generating the three-dimensional garment rendering 260. In particular, the materials utilized by the garment industry can be more varied than those for which libraries may already exist. For example, existing libraries 254 may comprise information about the material behavioral properties of, for example, cotton, but may not distinguish between, for example, Egyptian cotton, Pima cotton, and other like variants of cotton that may be relevant in the garment industry. In such a case, material behavioral properties 253, comprising the three-dimensional behavioral properties of a variety of materials relevant to the garment industry, can be provided, and utilized by, the virtual garment generation 250.

The virtual garment generation 250 can, in one embodiment, parse the garment construction specification 240 to first generate three-dimensional representations of each component of the garment specified in the garment construction specification. Subsequently, the virtual garment generation 250 can combine the generated garment components in the manner specified by the garment construction specification 240. In doing so, the virtual garment generation 250 can virtualize garment construction mechanisms, such as stitching, gluing, and the like, by appropriately modifying and joining the three-dimensional virtual garment components. As will be known by those skilled in the art, the three-dimensional virtual garment components can be generated based on a myriad of polygons assembled together in a known manner. In such a case, the virtual garment generation 250 can, in virtualizing garment construction mechanisms, modify the polygonal representations of the three-dimensional virtual garment components in a manner consistent with the garment construction mechanisms being virtualized, including, for example, by trimming, modifying, deleting, or otherwise changing one or more of the polygons of the relevant virtual garment components. In addition, the virtual garment generation 250 can apply three-dimensional rendering techniques, and three-dimensional behavioral models, so as to cause two or more virtual garment components that have been assembled together to appear, respond, and act, in a single unified manner.

In addition, in generating the three-dimensional garment rendering 260, the virtual garment generation 250 can place the virtual garment components, as they are constructed into the three-dimensional garment rendering, over the human avatar in an appropriate manner, taking into account the landmarks specified in the garment construction specification 240, and the landmark information 252. In addition, the virtual garment generation 250 can comprise information regarding the orientation of the virtual garment being constructed, such as the notions of "up" and "down", and "back" and "front", as within the context of the human avatar.

If multiple garment construction specifications were provided in tandem to the virtual garment generation 250, then the three-dimensional garment rendering 260 can comprise a three-dimensional rendering of each garment, if the garments were meant to be worn simultaneously on different parts of the body, such as a shirt and pants, or a blouse and a skirt. Alternatively, if the garments of the multiple garment construction specifications were meant to be worn on the same body part as layers, such as a shirt and a jacket or a shirt and a sweater, then the three-dimensional rendering 260 can, in rendering the topmost garment, take into account the structure and shape of underlying garments, that can, in one embodiment, have first been rendered in accordance with their specific garment construction specifications.

In one embodiment, the three-dimensional garment rendering 260 can be displayed to the user in conjunction with the user modification component 230, such that the user can apply modifications to the rendering, which can be translated by the user modification component 230 into specific, and discreet, changes to the garment construction specification 240. As shown in the system 200 of FIG. 2, such a revised garment construction specification can then, again, be provided to the virtual garment generation 250 to generate a new three-dimensional garment rendering, which can, and again, be provided to the user for further modification via the user modification component 230. In such a manner, an iterative process can be undertaken until a garment construction specification 240 is assembled that generates a three-dimensional garment rendering 260 whose appearance is in conformance with that desired by the garment designer.

Once such a final garment construction specification 240 is achieved, it can be provided to a garment maker, such as the garment maker 270, to enable the garment maker to construct a physical garment in accordance with the garment construction specification 240. Because the garment construction specification 240 can be in a computer-readable format, and can be in the form in which it can be meaningfully processed by a computer, it is contemplated that the garment construction specification 240 can be provided, by the garment maker 270, to the computer-controlled garment manufacturing processes to aid in the manufacture of the garment by the garment maker. Additionally, because of the detail provided by the garment construction specification 240, fewer aspects of the garment construction can be left unspecified, thereby reducing the chances of a miscommunication, misunderstanding, or other communicational error.

Figure 3:
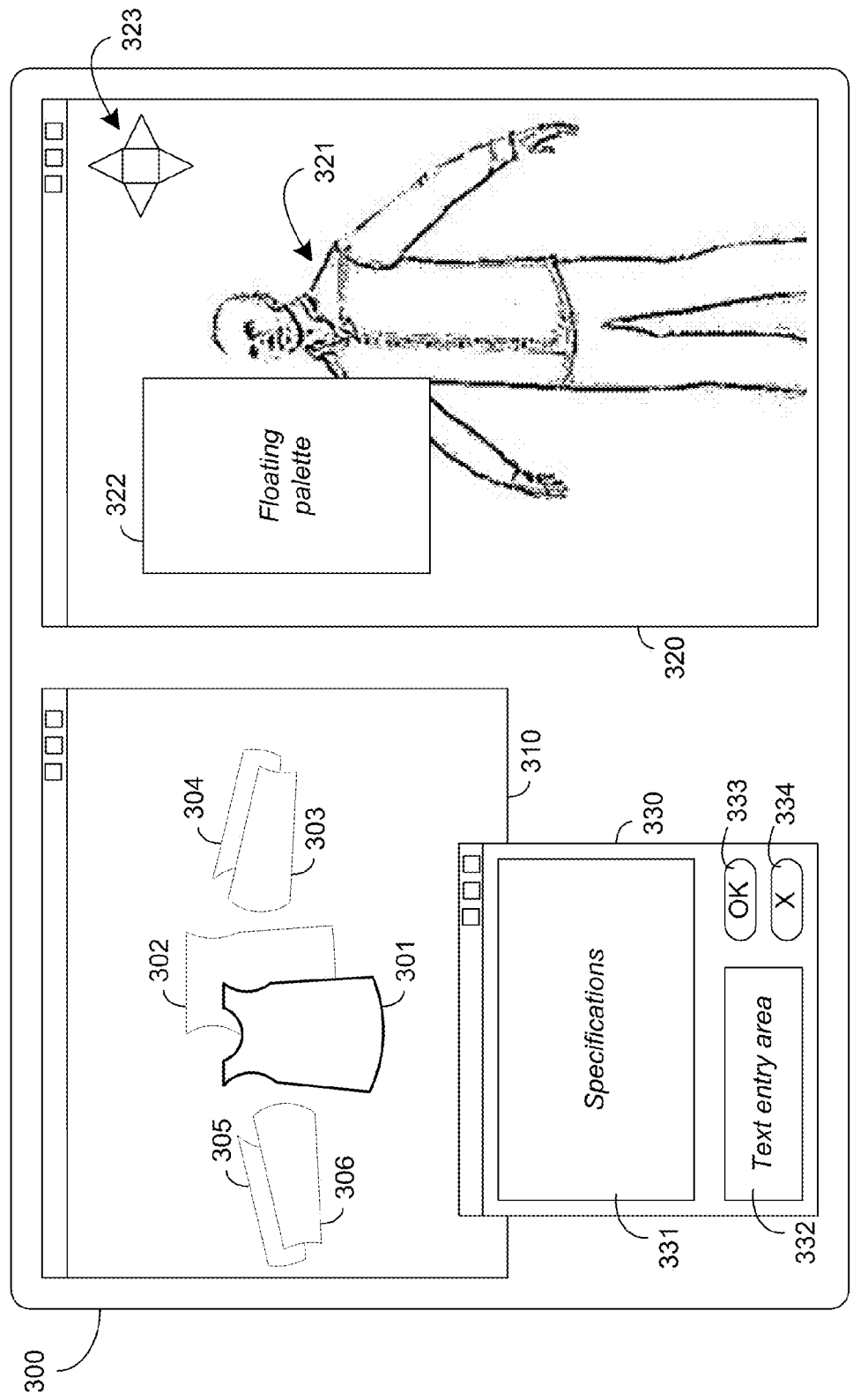
FIG. 3 is a block diagram of an exemplary user interface.

Turning to FIG. 3, an exemplary user interface 300 is shown therein. As can be seen, the exemplary user interface 300 can comprise a display area 310 in which garment components, such as can have been identified by the interpretation mechanisms 220 (shown in FIG. 2), can be displayed, a display area 320 in which a three-dimensional rendering of the garment can be displayed, and a display area 330 in which portions of the garment construction specification 240 (shown in FIG. 2) can be displayed. In other embodiments, the exemplary user interface 300 can comprise only some of the display areas 310, 320 and 330, though they are all shown together in FIG. 3 for ease of description and reference. Thus, for example, prior to the provision of the garment construction specification 240 (shown in FIG. 2) to the virtual garment generation 250 (also shown in FIG. 2), the user interface 300 may not comprise a display area 320.

In the embodiment shown in FIG. 3, the display area 310 can display one or more garment components, such as the garment components 301, 302, 303, 304, 305 and 306, which can have been identified by the interpretation mechanisms 220 (shown in FIG. 2). The user can be allowed to select such garment components for purposes of providing feedback, or further information, on any one specific, selected, garment component. Likewise, in one embodiment shown in FIG. 3, the display area 330 can comprise an area 331 for the display of one or more aspects, or portions, of the garment construction specification 240 (shown in FIG. 2). The display area 330 can further comprise the text entry area 332 within which the user could provide changes to one or more aspects, or portions, of the garment construction specification 240 (shown in FIG. 2), and can further provide an "OK" button 333 and a "Cancel" button 334 to enable the user to enter, or delete, their modifications.

In one embodiment, the display area 320 for displaying a three-dimensional visualization 321 of a garment constructed in accordance with the garment construction specification 240 (shown in FIG. 2) can comprise a directional control 323 for rotating and otherwise changing the view of the three-dimensional visualization. Additionally, the display area 320 can comprise an optional floating palette 322 that can enable the user to make changes to the three-dimensional visualization 321. For example, the user can be allowed to change the material of one or more of the garment components, change the manner in which two or more of the garment components are joined together, or reorient, or adjust, the virtual three-dimensional garment on the human avatar. The user can also be allowed to, for example, select from among different avatars, for different, predefined, sizing of the garment.

Again, as indicated, the user interface 300 shown in FIG. 3 is meant to be exemplary only, and is not meant to limit the described the mechanisms to the particular embodiment illustrated.

Figure 4:
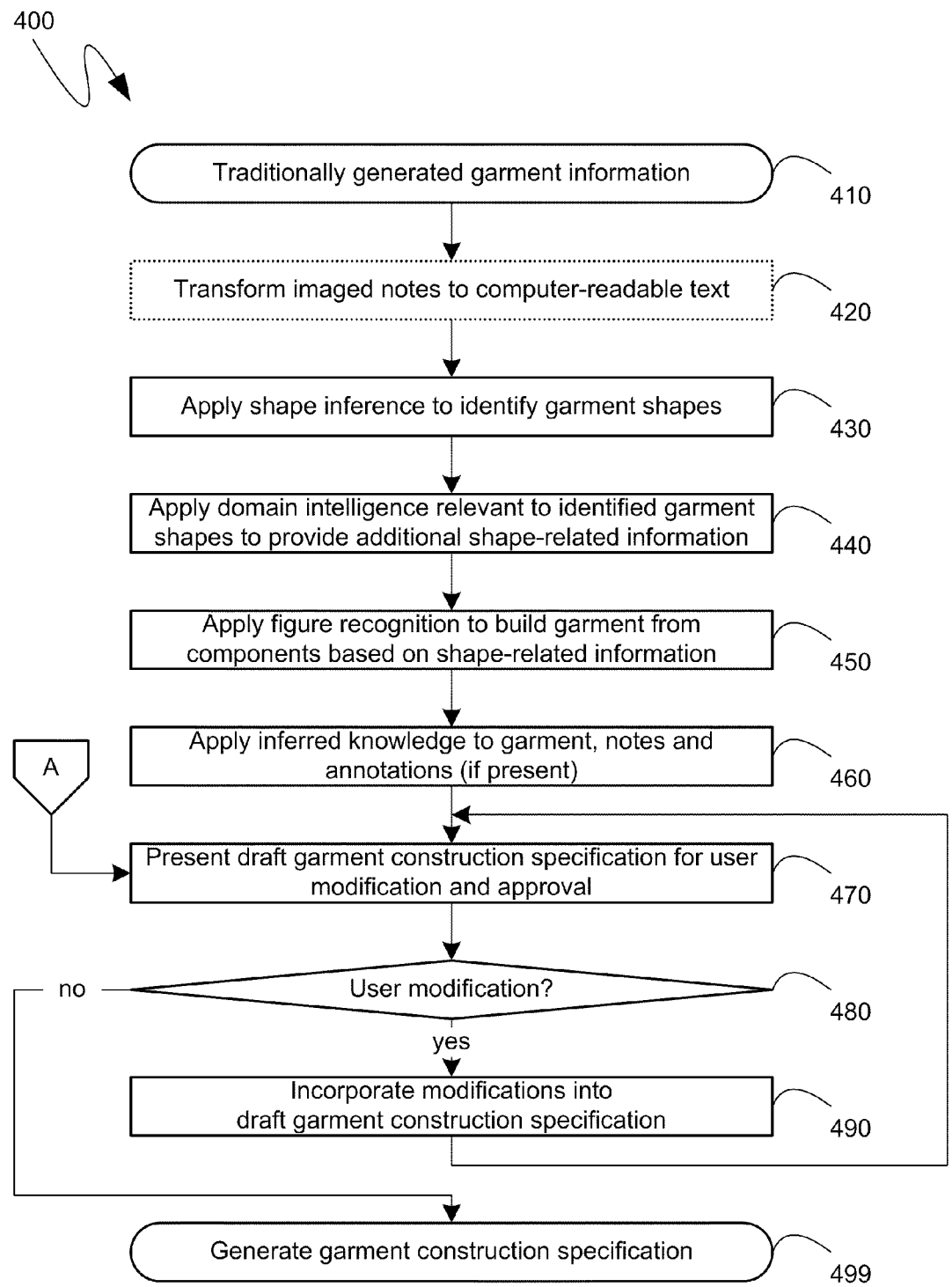
FIG. 4 is a flow diagram of an exemplary mechanism for generating a garment construction specification.

Turning to FIG. 4, the flow diagram 400 illustrates an exemplary series of steps that can be performed in generating, and finalizing, a garment construction specification. Initially, as shown in the flow diagram 400 of FIG. 4, traditionally generated garment information, such as, sketches, notes, two dimensional CAD drawings, and other like information can be provided at step 410. Subsequently, as an optional step 420, imaged notes and other materials containing written information in a digitized form can be converted to computer readable text, such as through OCR processes utilizing known OCR mechanisms.

At step 430, shape inference information can be applied to the information received at step 410 to identify garment shapes and determine the type of garment for which the garment construction specification is to be generated. Subsequently, at step 440, the domain intelligence relevant to the garment shapes identified at step 430 can be applied to provide additional shape related information, such as in the manner described in detail above. For example, as indicated previously, the domain intelligence can provide a basic structure for the garment construction specification that would be relevant to the type of garment identified at step 430. At step 450, figure recognition can be applied to determine how to build the garment from the garment components, as also in the manner described in detail above. For example, as indicated previously, the figure recognition applied at step 450 can make reference to known landmarks on the human body and can reference specific garment components, or sections thereof, as being associated with such landmarks.

At step 460, inferred knowledge can be applied to the garment components, and any notes and limitations that may have been present in the information provided at step 410. For example, as indicated previously, such inferred knowledge can include information regarding the typical construction options that can be applied to such a garment, and typical symbols, or shorthand, that may have been used to indicate a particular construction or a particular nuance of the garment. At step 470, then, a draft garment construction specification can be presented to the user and the user can be allowed to modify, either directly or indirectly, the garment construction specification. As shown in FIG. 3, the user modification, such as can be received at step 480, can comprise direct edits to the garment construction specification, or can comprise general edits, such as to particular garment components, or other visualizations, which can then be translated into specific changes at step 490. Thus, as shown in the flow diagram 400 of FIG. 4, if user input is received at step 480, the modifications called for by such user input can be made at step 490, and processing can return to step 470 to enable the user to make further modifications. If, however, no user modification is received at step 480, then the relevant processing can end with a final garment construction specification that can be generated at step 499.

Figure 5:
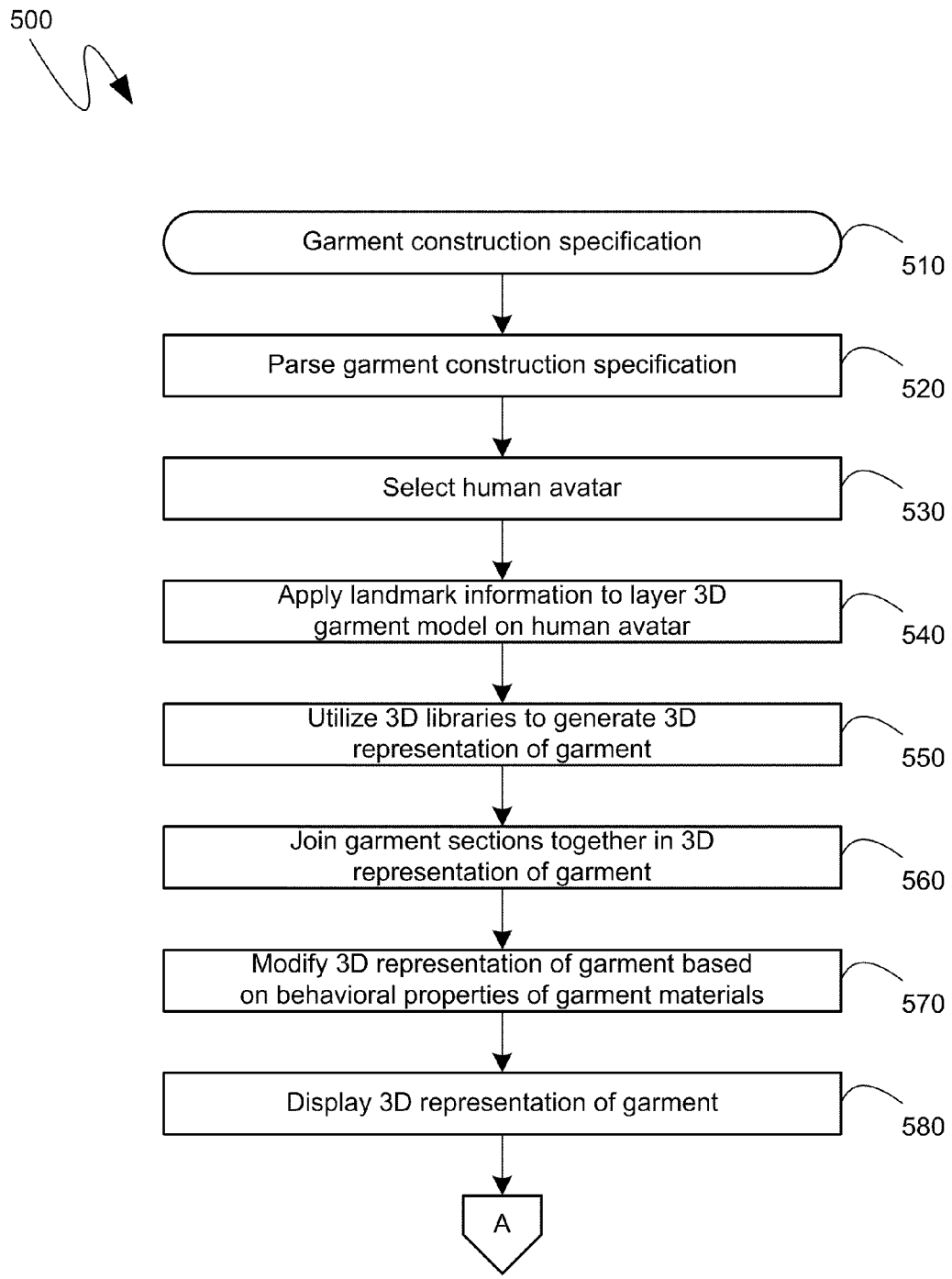
FIG. 5 is a flow diagram of an exemplary mechanism for generating a three dimensional representation of a garment from a garment construction specification.

Turning to FIG. 5, flow diagram 500 shown therein illustrates an exemplary series of steps that can be performed by a three-dimensional garment visualization process that can accept, as input, a garment construction specification, and can produce, as output, a three-dimensional representation of a garment constructed in the manner specified by the garment construction specification. Thus, as shown, a garment construction specification can be received at step 510. Subsequently, at step 520, the garment construction specification can be parsed to identify components of the garment that are to be individually rendered, and instructions as to the specific method, and location, of the joining of such components to form the garment. At step 530, a human avatar can be selected upon which the three-dimensional representation of the garment can be modeled.

At step 540, landmark information of the human avatar selected in step 530 can be referenced in conjunction with the landmark information specified in the garment construction specification to align components of the garment in an appropriate manner on the human avatar. At step 550 existing three-dimensional libraries and mechanisms can be utilized to generate a representation of the garment, or of one or more of the various garment components. At step 560, components, or sections, of the visualized three-dimensional garment can be joined in accordance with the garment construction specification. As indicated previously, the joining of three-dimensional representations of garment sections at step 560 can comprise the modifications of individual, or groups of, polygons of which such garment sections can be comprised, and the modification of the behavior of the garment sections to act as a single piece.

The three-dimensional representation of the garment can, at step 570, be modified in accordance with the specific behavioral properties of the materials of which the garment is made. Thus, as indicated previously, detailed behavioral models can be provided of the various materials utilized in the garment industry, and, at step 570, the three-dimensional representation of the garment can be modified in accordance with those behavioral models and in accordance with the material specified in the garment construction specification. Ultimately, at step 580, the three-dimensional representation of the garment, constructed in the manner called for by the garment construction specification received in step 510, can be displayed. In one embodiment, the processing can then return to step 470 of the flow diagram 400 of FIG. 4 to enable the user to provide additional modifications.

Although the steps of the flow diagrams 400 and 500 of FIGS. 4 and 5, respectively, have been shown in a particular order, their order is meant to be exemplary only since, as will be recognized by those skilled in the art, very few of the steps of the flow diagrams 400 and 500 are linearly dependent upon preceding steps. Thus, for example, in the flow diagram 400 of FIG. 4, the application of the domain intelligence at step 440, the figure recognition at step 450, and the inferred knowledge at step 460, can occur in any order after step 430, and not necessarily in the order listed. Similarly, in the flow diagram 500 of FIG. 5, the application of the detailed behavioral properties of the garment materials at step 570 can occur at any point after the three-dimensional representation of the garment is generated at step 550.

As can be seen from the above descriptions, mechanisms for generating a detailed garment construction specification in an automated manner have been enumerated. In view of the many possible variations of the subject matter described herein, we claim as our invention all such embodiments as may come within the scope of the following claims and equivalents thereto.

We claim:

1. One or more computer-readable media having computer-executable instructions for generating a garment construction specification, the computer-executable instructions performing steps comprising:
   receiving data defining two dimensional representations of a garment;
   applying shape inference to identify a type of the garment;
   applying figure recognition to define an application of the garment onto a human body;
   applying inferred knowledge to derive a type and location of a joining of two or more components of the garment; and
   utilizing the identification of the type of the garment, the defined application of the garment onto the human and the type and the location of the joining of two or more components of the garment to generate the garment construction specification, the garment construction specification comprising a first portion detailing the two or more components of the garment and a second portion providing instructions for assembling the garment from the two or more components.

2. The computer-readable media of claim 1, wherein the first portion of the garment construction specification comprises: coordinates defining boundaries of the two or more components of the garment; and information regarding material from which each of the two or more components of the garment are made.

3. The computer-readable media of claim 1, wherein the second portion of the garment construction specification comprises coordinate locations at which the two or more components of the garment are joined; and a manner in which the two or more components of the garment are joined at the coordinate locations.

4. The computer-readable media of claim 1, comprising further computer-executable instructions for receiving data defining another two dimensional representation of a second garment; wherein the applying the shape inference, the applying the figure recognition and the applying the inferred knowledge are informed by the other two dimensional representations of the second garment.

5. The computer-readable media of claim 1, comprising further computer-executable instructions for: presenting information regarding the generated garment construction specification to a user; receiving input from the user; and modifying the generated garment construction specification in accordance with the received input.

6. The computer-readable media of claim 5, wherein the presented information comprises a two-dimensional representation of at least one of the two or more components of the garment as specified in the generated garment construction specification.

7. The computer-readable media of claim 1, comprising further computer-executable instructions for: selecting a three-dimensional computer-generated human avatar upon which to render the garment specified by the generated garment construction specification; identifying landmarks on the three-dimensional computer-generated human avatar based on landmark information; generating a three-dimensional representation of the two or more components of the garment on the three-dimensional computer-generated human avatar in accordance with the identified landmarks and the generated garment construction specification; joining the three-dimensional representation of the two or more components of the garment in accordance with the generated garment construction specification; and applying, in accordance with the generated garment construction specification, material behavioral properties to the joined three-dimensional representation of the two or more components of the garment to generate a three-dimensional representation of the garment constructed in accordance with the generated garment construction specification.

8. The computer-readable media of claim 7, wherein the three-dimensional representation of the garment accounts for a shape and a structure of a second garment worn as a layer in conjunction with the garment, the second garment being defined by a second garment construction specification provided in tandem with the garment construction specification.

9. The computer-readable media of claim 7, wherein the computer-executable instructions for joining the three-dimensional representation of the two or more components of the garment comprise computer-executable instructions for modifying polygons of the three-dimensional representation of the two or more components of the garment to generate a single three-dimensional entity.

10. The computer-readable media of claim 7, comprising further computer-executable instructions for: displaying the three-dimensional representation of the garment constructed in accordance with the generated garment construction specification; receiving input from the user in response to the displaying; modifying the generated garment construction specification in accordance with the received input; and generating a three-dimensional representation of the garment constructed in accordance with the modified garment construction specification.

11. A computing device comprising:
   a first computer-readable medium having computer-executable instructions for generating a garment construction specification, the computer-executable instructions performing steps comprising:
   receiving data defining two dimensional representations of a garment;
   applying shape inference to identify a type of the garment;
   applying figure recognition to define an application of the garment onto a human body;
   applying inferred knowledge to derive a type and location of a joining of two or more components of the garment; and
   utilizing the identification of the type of the garment, the defined application of the garment onto the human and the type and the location of the joining of two or more components of the garment to generate the garment construction specification; and
   a second computer-readable medium comprising the garment construction specification, wherein the garment construction specification comprises:
   a first portion detailing two or more components of a garment; and a second portion, distinct from the first portion, providing instructions for assembling the garment from the two or more components.

12. The computing device of claim 11, wherein the first portion of the garment construction specification comprises: coordinates defining boundaries of the two or more components of the garment; and information regarding material from which each of the two or more components of the garment are made.

13. The computing device of claim 11, wherein the second portion of the garment construction specification comprises coordinate locations at which the two or more components of the garment are joined; and a manner in which the two or more components of the garment are joined at the coordinate locations.

14. The computing device of claim 11, further comprising a display for displaying a three-dimensional representation of the garment constructed in accordance with the generated garment construction specification, wherein the computer-executable instructions of the first computer-readable medium perform further steps comprising: selecting a three-dimensional computer-generated human avatar upon which to render the garment specified by the generated garment construction specification; identifying landmarks on the three-dimensional computer-generated human avatar based on landmark information; generating a three-dimensional representation of the two or more components of the garment on the three-dimensional computer-generated human avatar in accordance with the identified landmarks and the generated garment construction specification; joining the three-dimensional representation of the two or more components of the garment in accordance with the generated garment construction specification; and applying, in accordance with the generated garment construction specification, material behavioral properties to the joined three-dimensional representation of the two or more components of the garment to generate a three-dimensional representation of the garment constructed in accordance with the generated garment construction specifications.

15. The computing device of claim 14, wherein the computer-executable instructions of the first computer-readable medium perform further steps comprising: displaying the three-dimensional representation of the garment constructed in accordance with the generated garment construction specification; receiving input from the user in response to the displaying; modifying the generated garment construction specification in accordance with the received input; and generating a three-dimensional representation of the garment constructed in accordance with the modified garment construction specification.

* * * * *